United States Patent
Bhatia et al.

(10) Patent No.: US 11,544,931 B2
(45) Date of Patent: Jan. 3, 2023

(54) MACHINE LEARNING BASED HUMAN ACTIVITY DETECTION AND CLASSIFICATION IN FIRST AND THIRD PERSON VIDEOS

(71) Applicant: OTIS ELEVATOR COMPANY, Farmington, CT (US)

(72) Inventors: Amit Bhatia, Albany, CA (US); Guoqiang Wang, Albany, CA (US); Mahmoud El Chamie, Rocky Hill, CT (US); Claudio Pinello, Berkeley, CA (US); Ankit Tiwari, Bellevue, WA (US); Massimiliano L. Chiodo, Piedmont, CA (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/100,421

(22) Filed: Nov. 20, 2020

(65) Prior Publication Data
US 2021/0374424 A1 Dec. 2, 2021

Related U.S. Application Data

(60) Provisional application No. 63/029,837, filed on May 26, 2020.

(51) Int. Cl.
*H04N 5/77* (2006.01)
*G06V 20/40* (2022.01)
(Continued)

(52) U.S. Cl.
CPC ............ *G06V 20/47* (2022.01); *G06K 9/6259* (2013.01); *G06K 9/6269* (2013.01); *G06N 20/00* (2019.01)

(58) Field of Classification Search
CPC ............ G06K 9/00751; G06K 9/6259; G06K 9/6269; G06N 20/00
(Continued)

(56) References Cited

U.S. PATENT DOCUMENTS 7,200,266 B2 4/2007 Ozer et al.
8,892,491 B2 11/2014 Wang et al.
(Continued)

FOREIGN PATENT DOCUMENTS

CN 107168527 A 9/2017
CN 206529176 U 9/2017
(Continued)

OTHER PUBLICATIONS

European Office Action for Application No. 20213493.8; dated May 26, 2021; 7 Pages.
(Continued)

*Primary Examiner* — Robert Chevalier
(74) *Attorney, Agent, or Firm* — Cantor Colburn LLP

(57) ABSTRACT

An analytics device for monitoring maintenance on an elevator system performed by an individual including: a processor; and a memory including computer-executable instructions that, when executed by the processor, cause the processor to perform operations, the operations including: capturing a first video stream using a first video camera; extracting sequences from at least the first video stream; extracting features from the sequences; and analyzing, using a long short-term memory model, the sequence to determine whether the maintenance performed on the elevator system by the individual is performed correctly.

18 Claims, 7 Drawing Sheets

(51) Int. Cl.
*G06N 20/00* (2019.01)
*G06K 9/62* (2022.01)
*H04N 9/80* (2006.01)

(58) Field of Classification Search
USPC ........ 386/241, 242, 226, 227, 263, 322, 224
See application file for complete search history.

(56) References Cited

U.S. PATENT DOCUMENTS

| | | |
|---|---|---|
| 8,903,219 B2 | 12/2014 | Fan |
| 9,278,255 B2 | 3/2016 | Cheng et al. |
| 9,471,832 B2 | 10/2016 | Ding et al. |
| 9,830,516 B1 | 11/2017 | Biswas et al. |
| 2010/0063948 A1 | 3/2010 | Virkar et al. |
| 2013/0128051 A1 | 5/2013 | Velipasalar et al. |
| 2014/0161322 A1 | 6/2014 | Cheng et al. |
| 2015/0039260 A1 | 2/2015 | Niskanen et al. |
| 2015/0092981 A1 | 4/2015 | Kim et al. |
| 2015/0254555 A1 | 9/2015 | Williams, Jr. et al. |
| 2016/0034809 A1 | 2/2016 | Trenholm et al. |
| 2017/0364766 A1 | 12/2017 | Das et al. |
| 2020/0102188 A1 | 4/2020 | Holey et al. |
| 2020/0125923 A1 | 4/2020 | Jones |

FOREIGN PATENT DOCUMENTS

| | | | |
|---|---|---|---|
| EP | 3409629 | A1 | 12/2018 |
| JP | 3970520 | B2 * | 9/2007 |
| JP | 101557506 | A * | 10/2009 |
| JP | 106429689 | B * | 12/2018 |
| JP | 109035089 | A * | 12/2018 |
| JP | 108275524 | B * | 8/2019 |

OTHER PUBLICATIONS

Chinese Office Action for Application No. 202011393545.5; dated Sep. 7, 2022; 9 Pages.

* cited by examiner

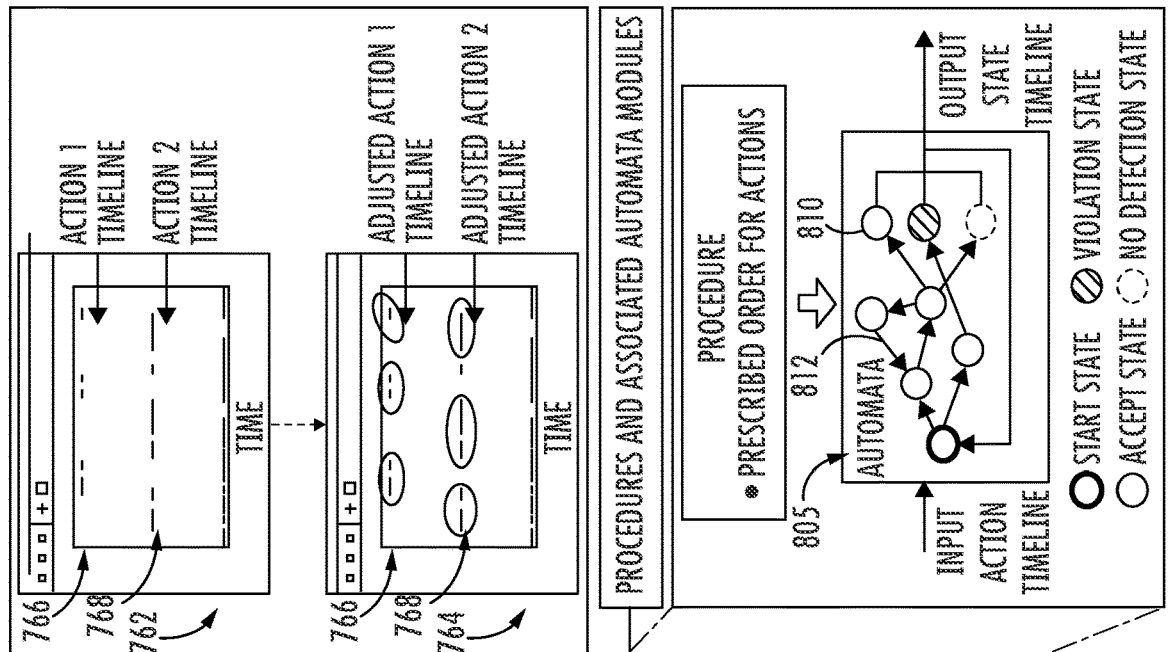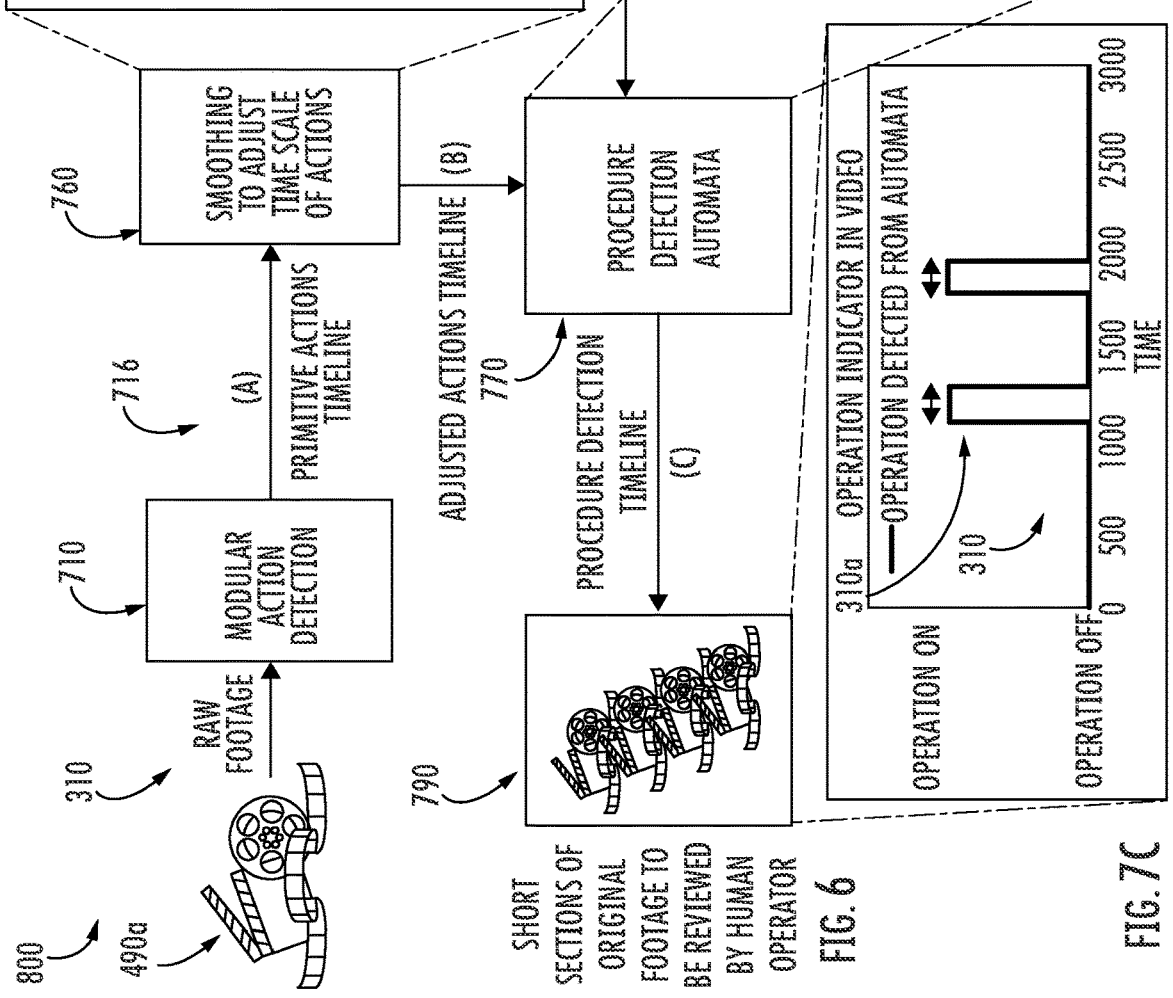

MACHINE LEARNING BASED HUMAN ACTIVITY DETECTION AND CLASSIFICATION IN FIRST AND THIRD PERSON VIDEOS

CROSS-REFERENCE TO RELATED APPLICATIONS

This application claims the benefit of 63/029,837 filed May 26, 2020, the disclosure of which is incorporated herein by reference in its entirety.

BACKGROUND

The subject matter disclosed herein relates generally to the field of conveyances systems, and specifically to a method and apparatus for monitoring maintenance of conveyance systems.

Monitoring maintenance of conveyance systems, such as, for example, elevator systems, escalator systems, and moving walkways may be difficult and/or costly.

BRIEF SUMMARY

According to an embodiment, an analytics device for monitoring maintenance on an elevator system performed by an individual is provided. The analytics device including: a processor; and a memory including computer-executable instructions that, when executed by the processor, cause the processor to perform operations, the operations including: capturing a first video stream using a first video camera; extracting sequences from at least the first video stream; extracting features from the sequences; and analyzing, using a long short-term memory model, the sequence to determine whether the maintenance performed on the elevator system by the individual is performed correctly.

In addition to one or more of the features described herein, or as an alternative, further embodiments may include that the analyzing, using the long short-term memory model, the sequence to determine whether the maintenance performed on the elevator system by the individual is performed correctly further includes: generating predictions on a frame of the first video stream based upon the sequences immediately prior to the frame.

In addition to one or more of the features described herein, or as an alternative, further embodiments may include that the predictions include predicted labels.

In addition to one or more of the features described herein, or as an alternative, further embodiments may include that the predicted labels include at least one of an activity, an object, or a human-hand-location.

In addition to one or more of the features described herein, or as an alternative, further embodiments may include that the operations further include: organizing the predicted labels into a timeline to form one or more automata composed of one or more states separated by actions; and comparing the automata to procedures to determine whether the maintenance performed on the elevator system by the individual is performed correctly.

In addition to one or more of the features described herein, or as an alternative, further embodiments may include that the operations further include: determining whether any of the predicted labels within a sequence logically conflict with each other.

In addition to one or more of the features described herein, or as an alternative, further embodiments may include that the long short-term memory model is trained by: obtaining training videos of individuals performing maintenance activities on the elevator system; labeling the training videos, wherein a region of interest is labeled with at least one of an activity, an object, or a human-hand-location; extracting frames and clips from the training videos; extracting sequences from the frames and clips of the training videos; and extracting features from the sequences from of the training videos to produce the training models.

In addition to one or more of the features described herein, or as an alternative, further embodiments may include that the operations further include: capturing a second video stream using a second video camera; and synchronizing the first video stream and the second video stream, wherein the sequences are extracted from at least the first video stream and the second video stream after synchronizing.

In addition to one or more of the features described herein, or as an alternative, further embodiments may include that the synchronizing the first video stream and the second video stream further including: detecting a time-stamp of the first video stream; detecting a time-stamp of the second video stream; and synchronizing the first video stream and the second video stream based on the time-stamp of the first video stream and the time-stamp of the second video stream.

In addition to one or more of the features described herein, or as an alternative, further embodiments may include that the synchronizing the first video stream and the second video stream further including: detecting a primitive action of the first video stream; detecting a primitive action of the second video stream; and synchronizing the first video stream and the second video stream based on the primitive action of the first video stream and the primitive action of the second video stream.

In addition to one or more of the features described herein, or as an alternative, further embodiments may include that the first video stream is a first person point of view, and wherein the second video stream is a third person point of view.

In addition to one or more of the features described herein, or as an alternative, further embodiments may include that the first video stream is a first person point of view.

In addition to one or more of the features described herein, or as an alternative, further embodiments may include that the operations further include: detecting data using a sensor in communication with a controller of the elevator system; and confirming whether the maintenance performed on the elevator system by the individual is performed correctly based on the data.

In addition to one or more of the features described herein, or as an alternative, further embodiments may include that the operations further include: detecting data using a sensor in communication with a controller of the elevator system; and determining whether the sensor is operating correctly based upon the data and the video stream.

In addition to one or more of the features described herein, or as an alternative, further embodiments may include that the first camera is located in a wearable device.

According to another embodiment, a computer program product embodied on a non-transitory computer readable medium is provided. The computer program product including instructions that, when executed by a processor, cause the processor to perform operations including: extracting sequences from at least the first video stream; extracting features from the sequences; and analyzing, using a long short-term memory model, the sequence to determine whether the maintenance performed on the elevator system by the individual is performed correctly.

In addition to one or more of the features described herein, or as an alternative, further embodiments may include that the analyzing, using the long short-term memory model, the sequence to determine whether the maintenance performed on the elevator system by the individual is performed correctly further includes: generating predictions on a frame of the first video stream based upon the sequences immediately prior to the frame.

In addition to one or more of the features described herein, or as an alternative, further embodiments may include that the predictions include predicted labels.

In addition to one or more of the features described herein, or as an alternative, further embodiments may include that the predicted labels include at least one of an activity, an object, or a human-hand-location.

In addition to one or more of the features described herein, or as an alternative, further embodiments may include that the operations further include: organizing the predicted labels into a timeline to form one or more automata composed of one or more states separated by actions; and comparing the automata to procedures to determine whether the maintenance performed on the elevator system by the individual is performed correctly.

Technical effects of embodiments of the present disclosure include analyzing maintenance performed on an elevator system utilizing video analytics of video streams from a first person video and/or a third person video.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 6 is a flow chart of a system-level method for multi-action procedure verification and detection in video streams, in accordance with an embodiment of the disclosure;

FIG. 7A is a primitive actions timeline as the output of the modular action detection module and an adjusted timeline by smoothing the primitive actions timeline over a time interval consistent with action duration, in accordance with an embodiment of the disclosure;

FIG. 7B is a detection module of the method of FIG. 6, in accordance with an embodiment of the disclosure;

FIG. 7C is an example of a procedure detection timeline in a video, in accordance with an embodiment of the disclosure;

DETAILED DESCRIPTION

Figure 1:
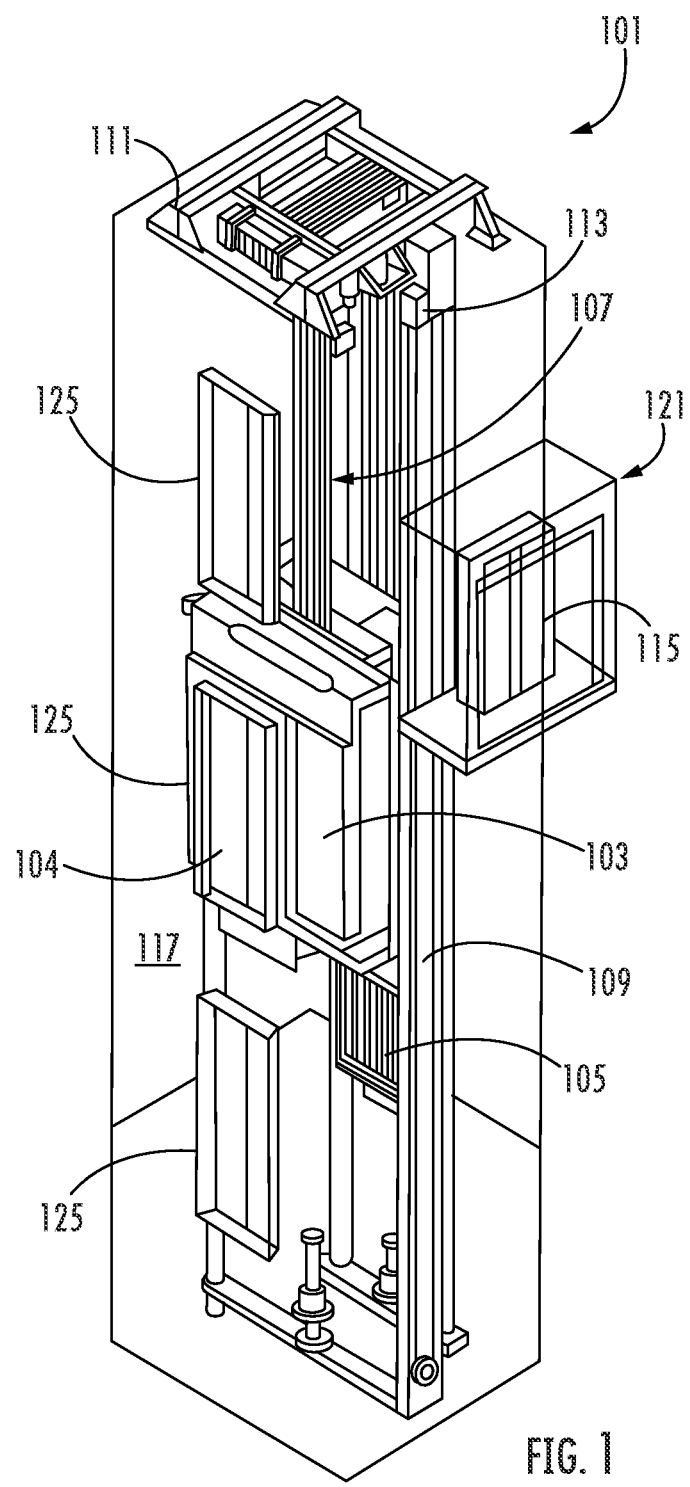
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

The elevator system 101 also includes one or more elevator doors 104. The elevator door 104 may be integrally attached to the elevator car 103 or the elevator door 104 may be located on a landing 125 of the elevator system 101. Embodiments disclosed herein may be applicable to both an elevator door 104 integrally attached to the elevator car 103 or an elevator door 104 located on a landing 125 of the elevator system 101. The elevator door 104 opens to allow passengers to enter and exit the elevator car 103.

Monitoring maintenance of conveyance systems, such as, for example, elevator systems, escalator systems, and moving walkways may be difficult and/or costly. In one example, video-based monitoring of maintenance may be performed to ensure technicians are correctly performing the maintenance, however this video-based monitoring requires an expert to review all the video, which is very labor intensive and does not scale very well. The embodiments disclosed herein relates to automating the review process of video-based maintenance monitoring.

Figure 2:
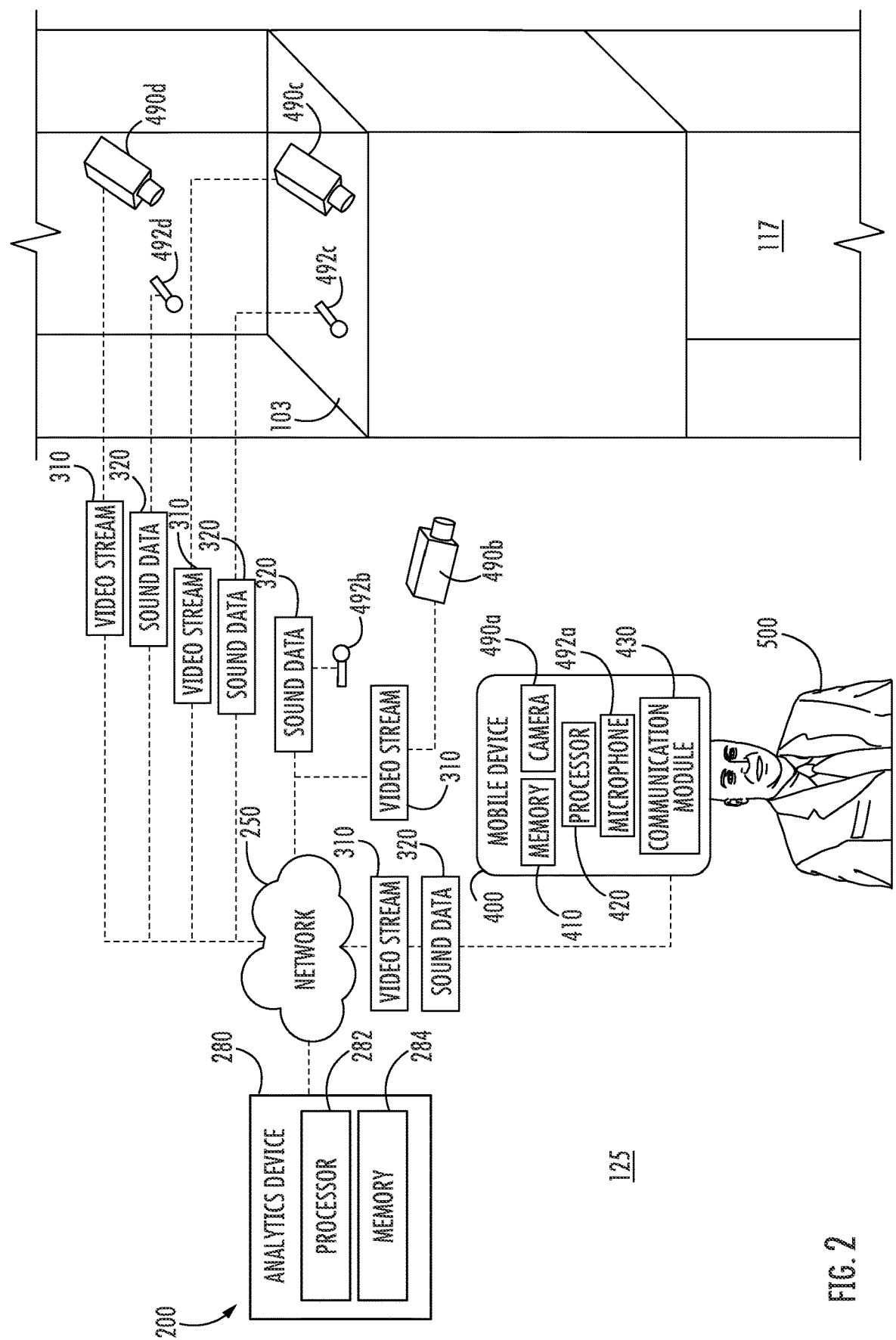
FIG. 2 is a schematic illustration of a maintenance monitoring system, in accordance with an embodiment of the disclosure.

Referring now to FIG. 2 with continued reference to FIG. 1, a maintenance monitoring system 200 is illustrated, in accordance with an embodiment of the present disclosure. It should be appreciated that, although particular systems are separately defined in the schematic block diagrams, each or any of the systems may be otherwise combined or separated via hardware and/or software. The maintenance monitoring system 200 is configured to monitor and analyze maintenance being performed by an individual 500 on an elevator system 101.

As illustrated in FIG. 2, the maintenance monitoring system 200 may include a camera 490a, 490b, 490c, 490d configured to capture a video stream 310 (e.g., a sequence of images). The monitoring system 200 may additionally include a microphone 492 configured to capture sound data. The camera 490a-490d and the microphone 492 may be composed into a single device. The maintenance monitoring system 200 may include one or more cameras 490a-490d and the locations of each of the cameras 490a-490d may vary as indicated in FIG. 2. Having only a single view-point may not be able to capture the entire maintenance activity being performed, thus it may be advantageous to have more than one camera 490a-490d.

In an embodiment, a camera 490a may be located within a mobile device 400 that is capable of being carried and/or worn by the individual 500. It is understood that there may be more than one individual 500 with more than one camera 490 onsite. The mobile device 400 may be worn on a head of the individual 500, such as, for example, in a hat, headband, or helmet. In an embodiment, the mobile device 400 is a wearable device and the camera 490a is located in the wearable device. Advantageously, if the camera 490a is worn while individual 500 is performing maintenance on the elevator system 101 or a specific component of the elevator system 101, the camera 490a may record video stream 310 from a first-person view of the individual 500. A microphone 492a may also be located within the mobile device 400.

In an embodiment, a camera 490b may be located on a landing 125 proximate the elevator system 101. A microphone 492b may also be located on the landing 125 proximate the elevator system 101. In an embodiment, a camera 490c may be located within the elevator car 103. A microphone 492c may also be located within the elevator car 103. In an embodiment, a camera 490d may be located within the elevator shaft 117. A microphone 492d may also be located within the elevator shaft 117. It is understood that while four example locations of cameras 490a-490d and microphones 492a-492d are illustrated, the embodiments disclosed herein apply to any location. Some other locations may include inside a machine room of an elevator system 101 or on a tripod brought to the elevator system 101 by the individual 500.

The mobile device 400 may belong to an individual 500, such as, for example, an elevator mechanic/technician working on the elevator system 101. The mobile device 400 may be a mobile device that is typically carried by a person, such as, for example a smart phone, cellular phone, PDA, smart watch, tablet, laptop, dedicated camera device, or similar device known to one of skill in the art.

The mobile device 400 may include a processor 420, memory 410, and a communication module 430, as shown in FIG. 2. The processor 420 can be any type or combination of computer processors, such as a microprocessor, microcontroller, digital signal processor, graphic processing unit (GPU), application specific integrated circuit, programmable logic device, and/or field programmable gate array. The memory 410 is an example of a non-transitory computer readable storage medium tangibly embodied in the mobile device 400 including executable instructions stored therein, for instance, as firmware. The communication module 430 may implement one or more communication protocols, such as, for example, short-range wireless protocols and long-range wireless protocols. The communication module 430 may be in communication with at least one of the computing network 250 and the analytics device 280. In an embodiment, the communication module 430 may be in communication with the analytics device 280 through the computing network 250 using at least one of short-range wireless protocols and long-range wireless protocols. Short-range wireless protocols may include but are not limited to Bluetooth, Wi-Fi, HaLow (801.11ah), zWave, ZigBee, or Wireless M-Bus. Long-range wireless protocols may include but are not limited to cellular, LTE (NB-IoT, CAT M1), LoRa, satellite, Ingenu, or SigFox.

The analytics device 280 may be a computing device, such as, for example, a desktop, a cloud based computer, and/or a cloud based artificial intelligence (AI) computing system. The analytics device 280 may include a processor 282 and an associated memory 284 comprising computer-executable instructions that, when executed by the processor 282, cause the processor 282 to perform various operations. The processor 282 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 284 may be but is not limited to a random access memory (RAM), read only memory (ROM), or other electronic, optical, magnetic or any other computer readable medium.

The mobile device 400 may also include the camera 490 and the microphone 492. The communication module 430 of the mobile device 400 is configured to transmit the video stream 310 and/or the sound data 320 to the analytics device 280 via short-range wireless protocols 203 and/or long-range wireless protocols 204. The communication module 430 may transmit the video stream 310 and/or the sound data 320 to the analytics device 280 through the computing network 250. The computing network 250 may be a computing network, such as, for example, a cloud computing network, cellular network, or any other computing network known to one of skill in the art.

The mobile device 400 may be configured to process the video stream 310 and/or the sound data 320 using the processor 420 prior to transmitting to the analytics device 280 through the communication module 430. This processing is known as edge processing. Alternatively, the mobile device 400 may be configured to transmit as raw data (i.e., unprocessed data) the video stream 310 and/or the sound data 320 to the analytics device 280 through the communication module 430. Then the analytics device 280 may process the video stream 310 and/or the sound data 320.

The cameras 490b-490d not located within the mobile device 400 may be configured to process the video stream 310 using a processor (not shown for simplicity) prior to transmitting to the analytics device 280 through a communication module (not shown for simplicity). This processing is known as edge processing. Alternatively, the communication module (not shown for simplicity) of the cameras 490b-490d not located within the mobile device 400 may be configured to transmit as raw data (i.e., unprocessed data) the video stream 310 to the analytics device 280. Then the analytics device 280 may process the video stream 310. The communication module (not shown for simplicity) of the cameras 490b-490d not located within the mobile device 400 may be wirelessly connected to the analytics device 280 through the computing network 250.

The microphones 492b-492d not located within the mobile device 400 may be configured to process the sound data 320 using a processor (not shown for simplicity) prior to transmitting to the analytics device 280 through a communication module (not shown for simplicity). This processing is known as edge processing. Alternatively, the communication module (not shown for simplicity) of the microphones 492b-492d not located within the mobile device 400 may be configured to transmit as raw data (i.e., unprocessed data) the sound data 320 to the analytics device 280. Then the analytics device 280 may process the sound data 320. The communication module (not shown for simplicity) of the microphones 492b-492d not located within the mobile device 400 may be wirelessly connected to the analytics device 280 through the computing network 250.

The video stream 310 may be processed to perform a compliance review of the maintenance performed on the elevator system 101. The compliance review of the maintenance performed may indicate whether the maintenance was correctly performed by the individual 500, as discussed further herein.

The sound data 320 may be processed to perform a compliance review of the maintenance performed on the elevator system 101. The compliance review of the maintenance performed may indicate whether the maintenance was correctly performed by the individual 500, as discussed further herein.

The video stream 310 and the sound data 320 may be processed separately or together to associate or link to perform a compliance review of the maintenance performed on the elevator system 101. For example, if the individual is required to turn a component until an audible "click", then the turning of the component may be captured by the video stream 310 and the audible click may be captured by the sound data 320.

Figure 3:
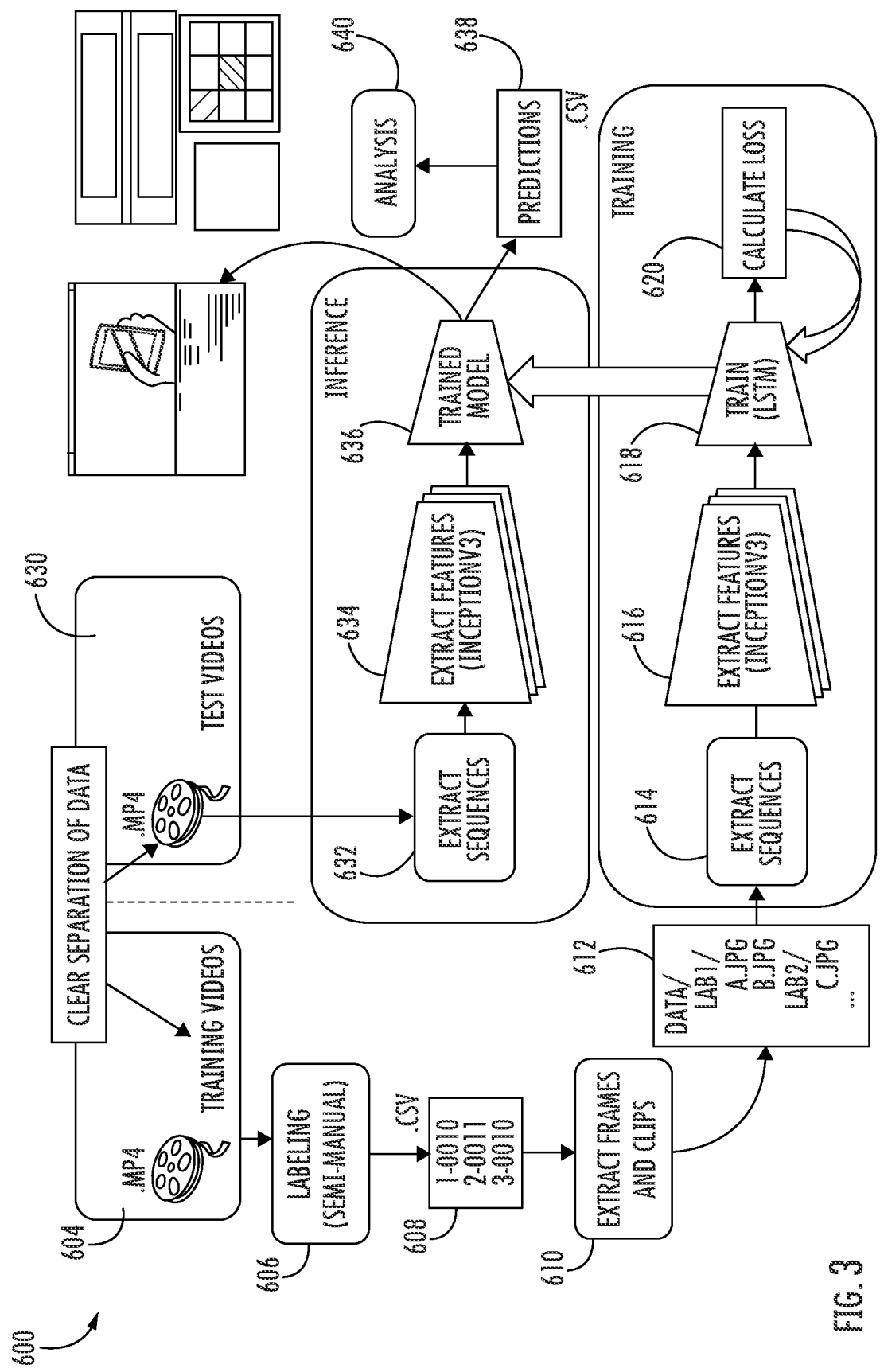
FIG. 3 is a flow chart of an analytics method for use by the maintenance monitoring system of FIG. 2, in accordance with an embodiment of the disclosure.

Referring now to FIG. 3, with continued referenced to FIGS. 1-2, an analytics method 600 for use by the maintenance monitoring system 200 of FIG. 2 is illustrated in accordance with an embodiment of the present disclosure. The analytics method 600 may be utilized by the analytics device 280 of FIG. 2. In an embodiment, the analytics method 600 may be stored in the form of software installed on or accessible to the analytics device 280 of FIG. 2. FIG. 3 is a computational architecture/workflow overview and FIG. 2 is a hardware architecture/schematic of the overall maintenance monitoring system 200. Blocks 604-620 are used for training to construct a model that will be used on the analytics device 280. The testing performed in blocks 632-634 is performed to assess the ability of the trained model 636 to recognize accurately the labels for video streams that were never used in training, using the best practices known to those of skill in the art. Blocks 632-634 may be used on the analytics device 280 for inference.

At block 604, training videos (i.e., training data sets) containing video streams 310 are obtained of individuals 500 performing maintenance activities on an elevator system 101. A training video of every possible maintenance activity on the elevator system 101 may be collected. In an embodiment, the training videos are recorded from a first person point of view. In another embodiment, the training videos are recorded from a third person point of view. In another embodiment, the training videos are recorded from a first person point of view and a third person point of view.

At block 606, the training videos are labeled. Every individual video frame of the training video and a region of interest in the video frame may be labeled with at least one of an activity, an object, or a human-hand-location with regard to an object. The activity may be opening a door, pressing a switch, fetching a key, or any other activity. The object may be a key, a lock, shoes, electric switches, doors, or any other object. The human-hand-location with regard to an object may be a hand holding a screwdriver, a hand next to a red button or any other human-hand-location.

At block 608, an output of the labeling process of block 606 is illustrated. The output may be a .csv file, which is a comma separated value file.

At block 610, frames and clips from the training videos are extracted and organized. The output of the organization is illustrated at block 612. The labeled data is organized, for example to train the machine learning system into a format that is suitable for the computational pipeline/libraries being utilized. At block 612, the frames and clips of the training videos are organized and saved. At block 614, sequences of the frames and clips and their labels are extracted.

At block 616, features within the sequences are extracted for the purpose of training to produce a long short-term memory (LSTM) model 636 configured to perform a compliance review of the maintenance performed on the elevator system 101. Features may include shapes and object recognition.

Block 616 is a neural network and may be a public domain network such as, for example, InceptionV3. Other networks and associated learned models (aka learned weights) could be used instead of "InceptionV3". Block 616 may only utilize the first stages of the public domain network which focus on detecting basic features rather than specific features. For example, a sphere may be a basic feature, whereas a baseball may be a specific feature. These features have been learned by the neural network in the process of learning to recognize images/objects, and are not designed explicitly. These features represent "presence of a given 2-D pattern in the (colored) image" (e.g. some patterns that might have been learned). For example, "the top portion of the image is mostly red", "there is a corner with vertical stripes", or "there is a sharp contrast along a diagonal edge in one certain area of the image".

At block 618, a LSTM model 636 is trained based on the extracted sequences and labels from block 614, and extracted features from block 616. The LSTM model 636 may be trained using at least one of machine leaning, data mining, an artificial recurrent neural network (RNN). In FIG. 3, the LSTM model 636 is a LSTM artificial neural network. At block 620, a loss of the LSTM model 636 is calculated using a specified function. The loss is back-propagated in the LSTM model 636 to update its weights (i.e. to train it, using methods known to one of skill in the art). The computed loss represents an accuracy of the LSTM model 636 against training video streams at block 604 and the labeled training video streams at block 614. Test videos are obtained at block 630 and sequences are extracted from the test videos at block 632. It is understood that when deployed in the field, the test videos of block 630 will be replaced with non-test video (e.g., live video streams 310). At block 634, features are extracted from the sequences of test videos and then fed into the LSTM model 636. The LSTM model 636 is configured to produce predictions 638 of the test videos and then the predictions are analyzed at block 640. In an embodiment, the LSTM model 636 is configured to generate predictions on every frame of the test video based upon a sequence of previous frames. The number of frames used to do predictions is a tunable variable in the architecture that is expected to affect performance and accuracy. It is a control knob that is trying to approximately capture intuition on "how long does an activity need to be observed continuously before it can be confidently determined what the activity is?".

The predictions 638 may include predicted labels such as, for example, activities, objects, and human-hand-location with regard to an object. The analysis at block 640 may be whether the maintenance activity is being performed correctly. This analysis may be done by a human visually reviewing the data or using analytics as discussed later in relation to FIGS. 6 and 10.

Figure 4:
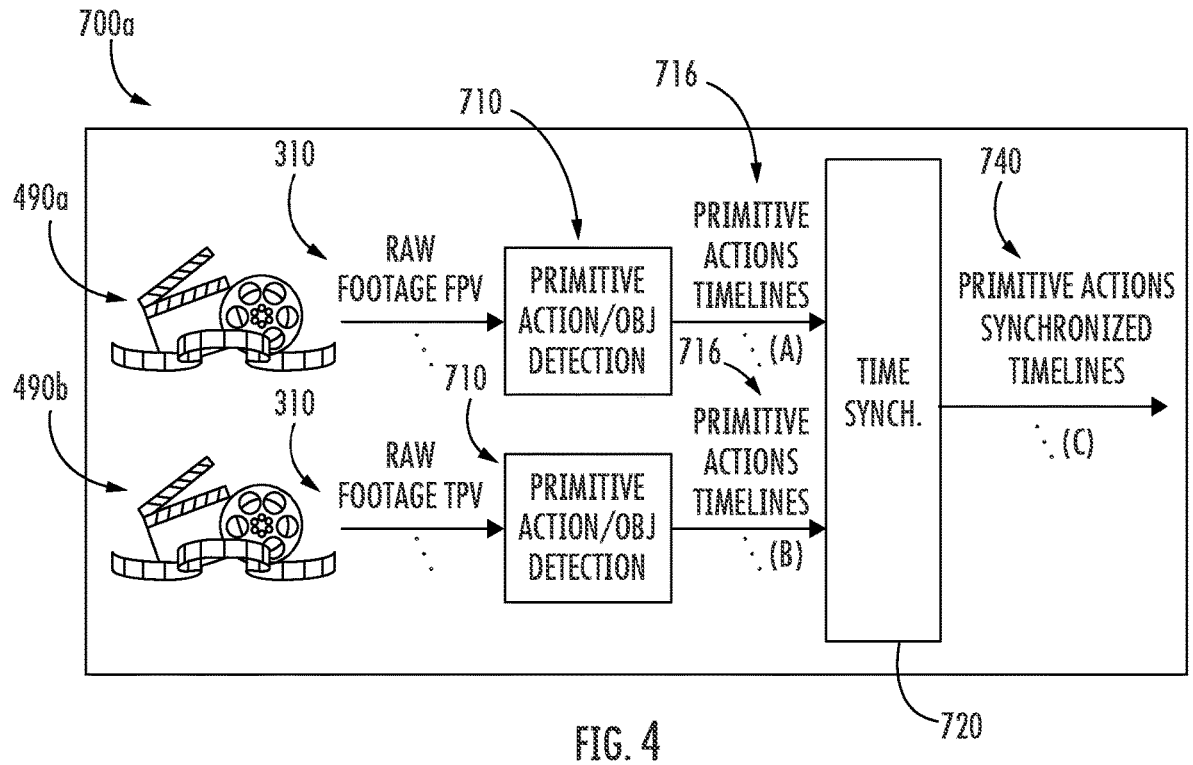
FIG. 4 is a flow chart of a method of synchronizing video stream from multiple cameras, in accordance with an embodiment of the disclosure.
Figure 5:
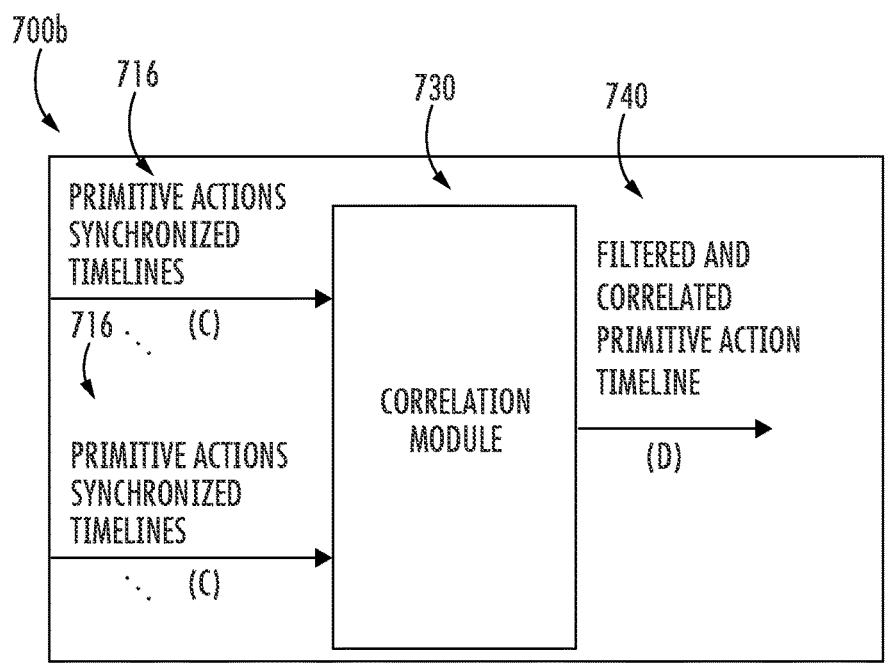
FIG. 5 is a flow chart of a method of synchronizing video stream from multiple cameras, in accordance with an embodiment of the disclosure.

Referring now to FIGS. 4 and 5 with continued reference to FIGS. 1-3, a method 700a, 700b of analyzing video streams 310 from multiple cameras 490a-490b is illustrated, according to an embodiment of the present disclosure. It is understood that while only two cameras 490a-490b are illustrated in FIG. 2, any number of cameras may be utilized. It may be advantageous to utilize multiple cameras 490a-490b to analyze maintenance performed on the elevator system 101 by an individual 500 because at any given moment in time one camera may be blurred or may simply not capture the maintenance in the field of view of the camera. For example, a camera 490a that is typically located on the body of the individual 500 may capture a first person point of view of hands of the individual 500 as the individual 500 performs the maintenance on the elevator system 101, whereas a camera 490b located off of the body of the individual 500 may capture a broader point of view of the maintenance being performed. Cameras 490b-490d that are stationary may provide a broader view of specific components of the elevator system 101.

An issue that arises when utilizing video stream 310 from more than one camera 490a-490b is synchronizing the video stream 310 so that the corresponding frames of videos streams from each camera are aligned. Method 700a of FIG. 4 solves this issue by synchronizing the video streams 310 based on time-stamps in each video stream, whereas method 700b of FIG. 5 solves this issue by synchronizing the videos based on common detected features.

As illustrated in FIG. 4, a camera 490a captures video stream 310 from a first person point of view and the video stream runs through an action and object detection module 710, which generates an output that is a timeline 716 indicating for each time interval what is the most likely primitive action(s) that is occurring.

As illustrated in FIG. 4, a camera 490b that is stationary captures video stream 310 from a third person point of view and the video stream runs through an action and object detection module 710, which generates an output that is a timeline 716 indicating for each time interval what is the most likely primitive action(s) that is occurring.

A primitive action detection method and/or object-detection method is used to get a timeline 716 for each video stream 310. Conventional action-detection algorithms for video streaming provide high accuracy to detect a primitive action (high true positives), but may suffer low recall (i.e., high number of false positives). The output timelines 716 from the action and object detection module 710 are first time-synchronized.

At block 720 of FIG. 4, the timelines 716 for each stream of video stream 310 may be synchronized based on pre-synchronized clocks and using those to time-stamp the video start (e.g., viable when using smart cameras such as a mobile phone device, first person camera, and similar).

At block 730 in FIG. 5, the timelines 716 for each stream of video stream 310 may also be synchronized based on primitive actions detected. The primitive action may be a specific action/signal from the individual 500 working on the elevator system (e.g., similar to the clapper board used in cinematography) or leveraging other sounds or actions that the individual 500 performs in the regular work package (e.g., doors of an elevator opening, the clicking of a button, etc.).

After synchronization, the various streams are correlated at 740 to improve the accuracy of the prediction (e.g., see predictions 638 FIG. 3), in particular to reduce the number of false positives. This can be achieved with a neural network/machine learning approach, especially when the number and kind of video streams 310 is known a priori (e.g. one on-body camera and one stationary camera). Approaches based on automata or other explicitly programmed filtering techniques are also possible (e.g. majority voting, priority-weighted voting, etc.). The voted stream can be processed to look for longer-term relations (correlations, causality, etc.) to verify adherence to standard work.

Referring now to FIGS. 6, 7A, 7B, and 7C, with continued reference to FIGS. 1-5, a method 800 for multi-action procedure verification and detection in video streams 310 is illustrated, in accordance with an embodiment of the present disclosure.

The method 800 has two inputs including a set of procedures and associated automata modules 705 from an operation manual where each procedure is defined by a set of primitive actions in a prescribed order and video stream 310 of an individual 500 performing the procedures from a camera 490a that is first-person wearable camera. The method 800 produces an output 790 that is a timeline indicating the part of the video stream 310 where the procedure has potentially successfully occurred or a potential violation of the procedures has occurred, and hence requires a review by a human operator.

As illustrated in FIG. 6, a camera 490a-490d captures a video stream 310 and the video stream 310 runs through an action and object detection module 710, which generates an output that is a timeline 716 indicating for each time interval what is the most likely action(s) that is occurring. At block 760, the timeline 716 is smoothed to adjust time scale of actions.

Block 760 may be part of block 730 of FIG. 5. Block 760 attempts to reduce the false positives by smoothing/filtering the timeline 716. In one example, smoothing would be to take a window of detections and assign to that window the action that was most present. In another example, smoothing would be as follows: for a given time instance, select a 1-second look-ahead window, and check in how many each primitive actions are present, and assign to that time instant the primitive action that occurred the most.

FIG. 7A illustrates a primitive actions timeline 762 as the output of the modular action and object detection module 710 and an adjusted timeline 764 formed by smoothing the primitive actions timeline 762 over a time interval consistent with action duration, in accordance with an embodiment of the disclosure. The primitive actions timeline 762 and the adjusted timeline 764 each include a first action time line 766 and a second action time line 768 that may be aligned once smoothed.

At block 770, the timelines 716 are compared to the procedures and associated automata modules 705. The primitive actions composing the selected procedures are first identified, and for each procedure automata module 805 is constructed as illustrated in FIG. 7B. Each automata module 805 is a finite state machine composed of a set of states 810 where the transition between states 810 occurs when an action 812 is detected. Each state 810 may be a specific event, such as, for example, "door is open", "in the elevator", or a similar event.

The automata 805 changes state 810 when an action 812 in the timeline is detected, an acceptance state of the automata 805 indicates that a set of actions 810 has occurred in a prescribed order that is consistent with the procedure and associated automata modules 705 within selected time limits. The automata 805 can also have a state 810 that indicates the section in the timeline when a wrong order is detected for a procedure, hence marked for review as a potential violation of a procedure. As mentioned above, the method 800 produces an output 790 that is a timeline indicating the part of the video stream 310 where the procedure has potentially successfully occurred or a potential violation of the procedures has occurred, and hence requires a review by a human operator. FIG. 7C is an example of a procedure detection timeline in a video stream 310 and illustrates the output of the automata 805, which highlights the section 310a of the video stream 310 that requires review by a human operator.

Figure 8:
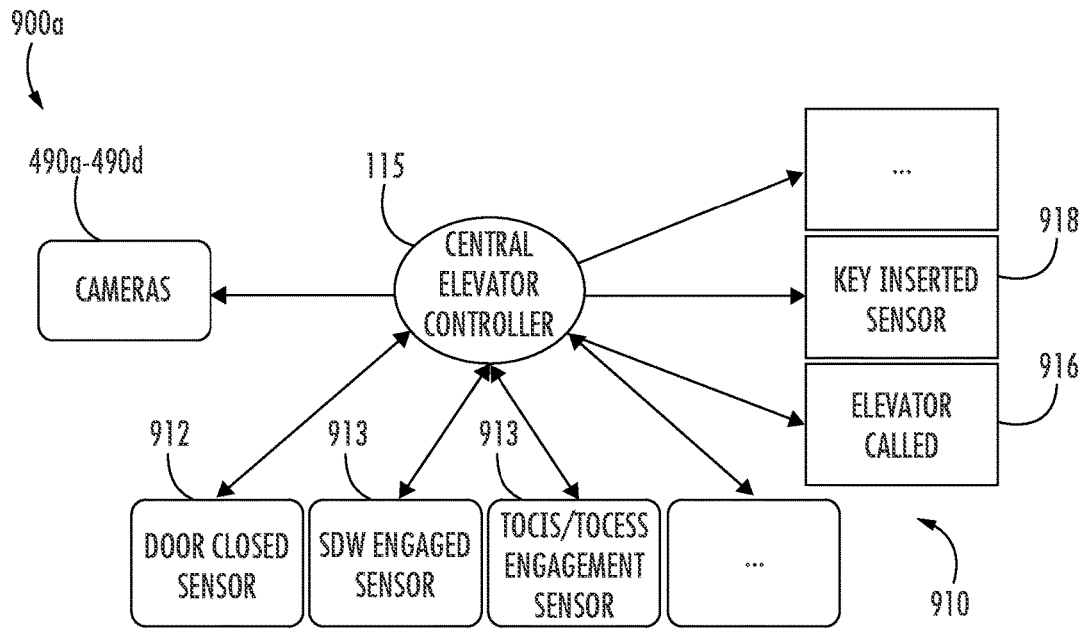
FIG. 8 is a flow chart of a method of utilizing a plurality of sensors of the elevator system with the maintenance monitoring system, in accordance with an embodiment of the disclosure.
Figure 9:
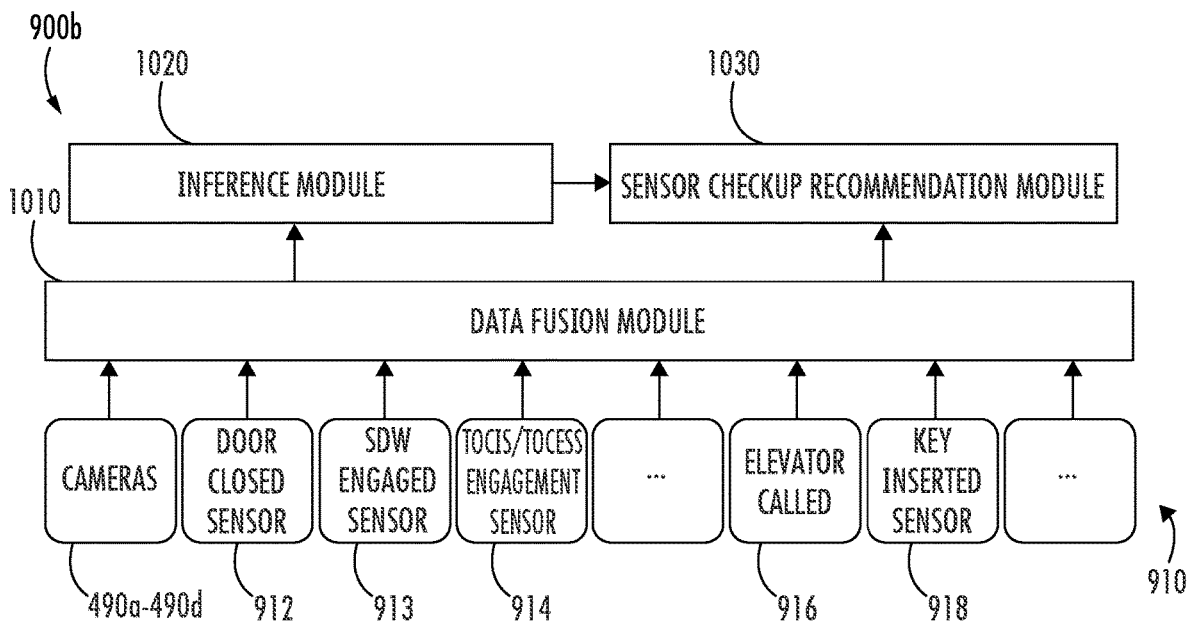
FIG. 9 is a flow chart of a method of utilizing a plurality of sensors of the elevator system with the maintenance monitoring system, in accordance with an embodiment of the disclosure.

Referring now to FIGS. 8 and 9, with continued reference to FIGS. 1-7, a method 900a, 900b of utilizing a plurality of sensors of the elevator system 101 with the maintenance monitoring system 200 is illustrated, in accordance with an embodiment of the present disclosure. In addition to the video stream 310 provided by the cameras 490a-490d, additional information may be provided by a plurality of other sensors 910 to help analyze the maintenance being performed by the individual 500. The plurality of sensors 910 may include a door closed sensor 912, a secure door wedge (SDW) engaged sensor 913, a top of car inspection switch (TOCIS)/top of car emergency stop switch (TOCESS) sensor 914, an elevator called sensor 916, a key inserted sensor 918, or any other sensor known to one of skill in the art. Each of the plurality of sensors 910 may be in communication with the controller 115 of the elevator system 101. Each of the cameras 490a-490d may also be in communication with the controller 115 of the elevator system 101.

This enables the correspondence relation between cameras 490a-490d and the plurality of sensors 910, which also allows the cameras 490a-490d to use as reference clock the common base clock of the controller 115 of the elevator system 101. Therefore, all video stream 310 generated by the cameras 490a-490d and all data generated by the plurality of sensors 910 are time-stamped with respect to the same reference clock. This provides a data fusion module 1010 with a global view on the temporal order of the events that are captured by the cameras 490a-490d and the plurality of sensors 910. The data from the plurality of sensors 910 and the video stream 310 from the cameras 490a-490d are partially labeled and sent to the inference module 1020.

When the data received from the plurality of sensors 910 is considered reliable, an activity/task inference only needs to be applied to those video segments without annotation by the data fusion module. In other words, the annotations based on the data received from sensors 910 are the ground truth since the sensor data can be trusted and is reliable. However when a confidence level of inferences based on the video stream 310 is high, its result can be used to make checkup/recalibration recommendation for the plurality of sensors 910 whose data are different from what the inference module 1020 predicts for corresponding frames. In this scenario, data from sensors 910 is not reliable. For example, some of the reasons may be that the sensors 910 may need to be calibrated. Since the inference confidence level is high, the inference result is considered as a ground truth and can be used to calibrate the sensors 910.

Figure 10:
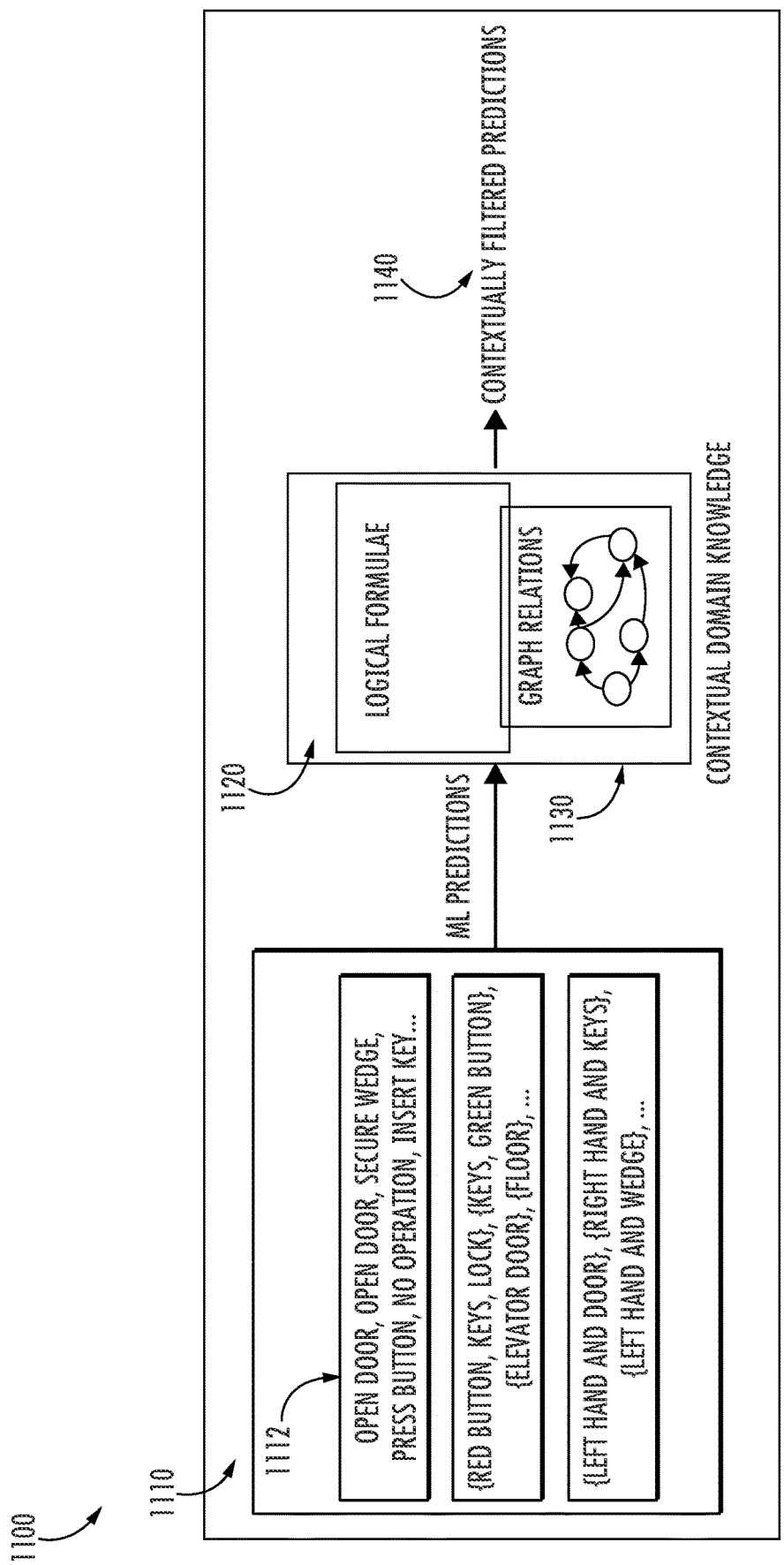
FIG. 10 is a flow chart of a method for improving the detection and classification of human activities in video data through the use of contextual information, in accordance with an embodiment of the disclosure.

Referring now to FIG. 10, with continued reference to FIGS. 1-9, a method 1100 for improving the detection and classification of human activities in video data 310 through the use of contextual information is illustrated, in accordance with an embodiment of the present disclosure.

The input data for the method 1100 is sequences 1110 of predicted labels 1112 that are output of a combination of multiple machine learning based classifiers. The predicted labels 1112 are generated in the predictions 638 of FIG. 3. The predicted labels 1112 include at least one of an activity (e.g., Open door, press switch, fetch a key), an object (e.g., key, lock, shoes, electric switches, doors), or a human-hand-location with regard to an object (e.g., hand holding a screwdriver, hand next to a red button). The optimal choice of the combination of activities, objects, and human-hand-location can be fine-tuned to an application of interest. The inter-relationship reflecting domain knowledge between different types of labels (e.g., activities, objects, human-hand-location, etc.) is represented using a combination of logical formulas 1120 and graph representations 1130. A given set of logical formulas 1120 and graph representations 1130 could for example represent the constraints that should hold true between different predicted labels 1112 in a given sequence 1110 of predicted labels 1112 when the actual activity being performed is "Opening a Door". The logical formula 1120 could be for example simple propositional formulas or more sophisticated formula, such as those expressed using temporal logics (e.g., LTL, CTL, or mu-calculus). The output of the method 1100 is a subset of the predicted input labels that respect the provided domain knowledge and result in more likely to reflect actual activity. Any of the predicted labels 1112 within a sequence 1110 that logically conflict with each other will be removed. In other words, sequences 1110 of predicted labels 1112 that do not logically make sense will be removed. For example, an individual 500 cannot press elevator buttons within the elevator car 103 if the individual 500 is currently located outside of the elevator car 103 and the doors 104 of the elevator car 103 are closed.

The sequence reflects mapping of predicted labels 1112 on every frame to a set of constraints. The predicted labels 1112 could be about an activity, an object, an individual 500, or any combination thereof. Sequences reflect different types of constraints that are known should happen or not happen as time progresses. For example, if tracking the order (i.e., sequence) in which certain objects should appear in a video stream, then a sequence can be composed out of object labels and compare it against an appropriate set of constraints.

On the same video frames, predicted labels 1112 may also be determined about individual 500 or activities of the individual 500. Subsets of the predicted labels 1112 may be composed into sequences and then compare those sequences against respective constraints. For example, a predicted label 1112 for an object may include: Screwdriver, hammer, nail, insulated tape. For example, a predicted label 1112 for an individual 500 (i.e., human) may include: 1 human, 2 humans, human hand, human shoes. For example, a predicted label 1112 for an activity may include holding a screwdriver, rotating a knob clockwise, taking an object out of bag, pressing a button. Note that in the above examples and approaches there may be an allowance for dropping of very noisy labels. There could be some frames in between where we do not have any definite labels. Each of these sequences may be compared against different type of constraints (each reflecting different part of contextual information).

As described above, embodiments can be in the form of processor-implemented processes and devices for practicing those processes, such as processor. Embodiments can also be in the form of computer program code (e.g., computer program product) containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An analytics device for monitoring maintenance on an elevator system performed by an individual, the analytics device comprising:
   a processor; and
   a memory comprising computer-executable instructions that, when executed by the processor, cause the processor to perform operations, the operations comprising:
      capturing a first video stream using a first video camera;
      extracting sequences from at least the first video stream;
      extracting features from the sequences; and
      analyzing, using a long short-term memory model, the sequence to determine whether the maintenance performed on the elevator system by the individual is performed correctly;
      wherein the analysing further comprises generating predictions on a frame of the first video stream based upon the sequences immediately prior to the frame.

2. The analytics device of claim 1, wherein the predictions include predicted labels.

3. The analytics device of claim 2, wherein the predicted labels include at least one of an activity, an object, or a human-hand-location.

4. The analytics device of claim 2, wherein the operations further comprise:
organizing the predicted labels into a timeline to form one or more automata composed of one or more states separated by actions; and
comparing the automata to procedures to determine whether the maintenance performed on the elevator system by the individual is performed correctly.

5. The analytics device of claim 2, wherein the operations further comprise:
determining whether any of the predicted labels within a sequence logically conflict with each other.

6. The analytics device of claim 1, wherein the long short-term memory model is trained by:
obtaining training videos of individuals performing maintenance activities on the elevator system;
labeling the training videos, wherein a region of interest is labeled with at least one of an activity, an object, or a human-hand-location;
extracting frames and clips from the training videos;
extracting sequences from the frames and clips of the training videos; and
extracting features from the sequences from of the training videos to produce the training models.

7. An analytics device for monitoring maintenance on an elevator system performed by an individual, the analytics device comprising:
a processor; and
a memory comprising computer-executable instructions that, when executed by the processor, cause the processor to perform operations, the operations comprising:
capturing a first video stream using a first video camera;
extracting sequences from at least the first video stream;
extracting features from the sequences; and
analyzing, using a long short-term memory model, the sequence to determine whether the maintenance performed on the elevator system by the individual is performed correctly;
wherein the operations further comprise:
capturing a second video stream using a second video camera; and
synchronizing the first video stream and the second video stream,
wherein the sequences are extracted from at least the first video stream and the second video stream after synchronizing.

8. The analytics device of claim 7, wherein the synchronizing the first video stream and the second video stream further comprising:
detecting a time-stamp of the first video stream;
detecting a time-stamp of the second video stream; and
synchronizing the first video stream and the second video stream based on the time-stamp of the first video stream and the time-stamp of the second video stream.

9. The analytics device of claim 7, wherein the synchronizing the first video stream and the second video stream further comprising:
detecting a primitive action of the first video stream;
detecting a primitive action of the second video stream; and
synchronizing the first video stream and the second video stream based on the primitive action of the first video stream and the primitive action of the second video stream.

10. The analytics device of claim 7, wherein the first video stream is a first person point of view, and
wherein the second video stream is a third person point of view.

11. The analytics device of claim 1, wherein the first video stream is a first person point of view.

12. The analytics device of claim 1, wherein the operations further comprise:
detecting data using a sensor in communication with a controller of the elevator system; and
confirming whether the maintenance performed on the elevator system by the individual is performed correctly based on the data.

13. An analytics device for monitoring maintenance on an elevator system performed by an individual, the analytics device comprising:
a processor; and
a memory comprising computer-executable instructions that, when executed by the processor, cause the processor to perform operations, the operations comprising:
capturing a first video stream using a first video camera;
extracting sequences from at least the first video stream;
extracting features from the sequences; and
analyzing, using a long short-term memory model, the sequence to determine whether the maintenance performed on the elevator system by the individual is performed correctly;
wherein the operations further comprise:
detecting data using a sensor in communication with a controller of the elevator system; and
determining whether the sensor is operating correctly based upon the data and the video stream.

14. The analytics device of claim 1, wherein the first camera is located in a wearable device.

15. A computer program product embodied on a non-transitory computer readable medium, the computer program product including instructions that, when executed by a processor, cause the processor to perform operations comprising:
extracting sequences from at least the first video stream;
extracting features from the sequences; and
analyzing, using a long short-term memory model, the sequence to determine whether the maintenance performed on the elevator system by the individual is performed correctly;
wherein the analyzing further comprises generating predictions on a frame of the first video stream based upon the sequences immediately prior to the frame.

16. The computer program product of claim 15, wherein the predictions include predicted labels.

17. The computer program product of claim 16, wherein the predicted labels include at least one of an activity, an object, or a human-hand-location.

18. The computer program product of claim 16, wherein the operations further comprise:
organizing the predicted labels into a timeline to form one or more automata composed of one or more states separated by actions; and comparing the automata to procedures to determine whether the maintenance performed on the elevator system by the individual is performed correctly.

* * * * *